(12) United States Patent
Ashok et al.

(10) Patent No.: US 9,104,454 B2
(45) Date of Patent: *Aug. 11, 2015

(54) VIRTUAL IMAGE OVERLOADING FOR SOLUTION DEPLOYMENT

(71) Applicant: International Business Machines Corporation, Armonk, NY (US)

(72) Inventors: Rohith K. Ashok, Apex, NC (US); Matt R. Hogstrom, Cary, NC (US); Jose Ortiz, Raleigh, NC (US); Ruth E. Willenborg, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 278 days.

This patent is subject to a terminal disclaimer.

(21) Appl. No.: 13/740,906

(22) Filed: Jan. 14, 2013

(65) Prior Publication Data

US 2013/0132956 A1  May 23, 2013

Related U.S. Application Data

(63) Continuation of application No. 12/767,170, filed on Apr. 26, 2010, now Pat. No. 8,381,211.

(51) Int. Cl.
*G06F 9/455* (2006.01)
*G06F 9/445* (2006.01)

(52) U.S. Cl.
CPC ............. *G06F 9/45533* (2013.01); *G06F 8/63* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 6,477,624 B1 | 11/2002 | Kedem et al. | |
| 7,577,722 B1 * | 8/2009 | Khandekar et al. | 709/220 |
| 2006/0248527 A1 | 11/2006 | Jaeckel et al. | |
| 2007/0006205 A1 | 1/2007 | Kennedy et al. | |
| 2009/0077551 A1 * | 3/2009 | Whiteley | 718/1 |

(Continued)

OTHER PUBLICATIONS

United States Patent and Trademark Office, Notice of Allowance for U.S. Appl. No. 13/435,034, Mar. 6, 2014, pp. 1-5, Alexandria, VA, USA.

(Continued)

*Primary Examiner* — Gregory A Kessler
(74) *Attorney, Agent, or Firm* — Lee Law, PLLC; Christopher B. Lee

(57) ABSTRACT

An instantiable virtual machine part definition and part configuration metadata of an instantiable virtual machine capable of deployment as at least a portion of a service solution is received from a master overloaded virtual image. A determination is made as to whether to configure the instantiable virtual machine to reuse, using virtual image sharing, at least one portion of the master overloaded virtual image during deployment of the instantiable virtual machine within a service solution. A minimal executable virtual machine part core of the instantiable virtual machine that reuses, using the virtual image sharing, the at least one portion of the master overloaded virtual image during execution is identified. A minimal executable virtual machine part instantiable from the identified minimal executable virtual machine part core as the instantiable virtual machine is configured to utilize, using the virtual image sharing, a shared resource within the master overloaded virtual image during execution.

18 Claims, 6 Drawing Sheets

(56) References Cited

U.S. PATENT DOCUMENTS

2009/0094576 A1 4/2009 Bouchard, Sr. et al.
2010/0306772 A1 12/2010 Arnold et al.

OTHER PUBLICATIONS

Jin Ryong Kim, et al., Hierarchical QoS Architecture for Networked Virtual Dancing Environment, Article, International Conference Artificial Reality Telexistence , Dec. 2003, pp. 1-8, The Virtual Reality Society of Japan, Japan.

Alan Dearle, Software Deployment, Past, Present and Future, Article, International Conference on Software Engineering, 2007, pp. 269-284, IEEE Computer Society, Washington, DC, USA.

Jin Ryong Kim, et al., Hierarchical QoS Architecture for Virtual Dancing Environment, Article, Journal of Kiss: Computer Systems and Theory, Dec. 2003, pp. 675-690, vol. 30, No. 11-12, Korea Information Science Society, South Korea.

Darrell Reimer et al., Opening Black Boxes: using Semantic Information to Combat Virtual Machine Image Sprawl, Article, Proceedings of the 4th ACM SIGPLAN/SIGOPS International Conference on Virtual Execution Environments, Mar. 2008, pp. 111-120, Association for Computing Machinery, New York, NY, USA.

United States Patent and Trademark Office, Office Action for U.S. Appl. No. 12/767,170, Jun. 26, 2012, pp. 1-12, Alexandria, VA, USA.

United States Patent and Trademark Office, Notice of Allowance for U.S. Appl. No. 12/767,170, Oct. 17, 2012, pp. 1-8, Alexandria, VA, USA.

United States Patent and Trademark Office, Office Action for U.S. Appl. No. 13/435,034, Dec. 2, 2013, pp. 1-16, Alexandria, VA, USA.

\* cited by examiner

VIRTUAL IMAGE OVERLOADING FOR SOLUTION DEPLOYMENT

RELATED APPLICATIONS

This application is a continuation of and claims priority to and claims the benefit of U.S. patent application Ser. No. 12/767,170 titled "VIRTUAL IMAGE OVERLOADING FOR SOLUTION DEPLOYMENT," which was filed in the United States Patent and Trademark Office on Apr. 26, 2010, and which has a current status of "Allowed," and this application is related to co-pending U.S. patent application Ser. No. 13/435,034 titled "VIRTUAL IMAGE OVERLOADING FOR SOLUTION DEPLOYMENT," which was filed in the United States Patent and Trademark Office on Mar. 30, 2012, both of which are incorporated herein by reference in their entirety.

BACKGROUND

The present invention relates to solution deployment within hypervisor platform computing clouds. More particularly, the present invention relates to virtual image overloading for solution deployment.

A hypervisor platform represents a virtualized hardware platform. A hypervisor cloud represents a collection of servers or other computing devices that operate using a common hypervisor platform. Different virtual images may be loaded onto different computing devices within a hypervisor cloud to implement a service solution.

BRIEF SUMMARY

A method includes receiving, at a virtual image configuration device, an instantiable virtual machine part definition and part configuration metadata of an instantiable virtual machine capable of deployment as at least a portion of a service solution from a master overloaded virtual image; determining whether to configure the instantiable virtual machine to reuse, via virtual image sharing, at least one portion of the master overloaded virtual image during deployment of the instantiable virtual machine within a service solution; identifying, from the instantiable virtual machine part definition and part configuration metadata in response to determining to configure the instantiable virtual machine to reuse, via the virtual image sharing, the at least one portion of the master overloaded virtual image, a minimal executable virtual machine part core of the instantiable virtual machine that reuses, via the virtual image sharing, the at least one portion of the master overloaded virtual image during execution; and configuring a minimal executable virtual machine part instantiable from the identified minimal executable virtual machine part core as the instantiable virtual machine to utilize, via the virtual image sharing, a shared resource within the master overloaded virtual image during execution.

A system includes a communication module and a processor programmed to: receive, via the communication module, an instantiable virtual machine part definition and part configuration metadata of an instantiable virtual machine capable of deployment as at least a portion of a service solution from a master overloaded virtual image; determine whether to configure the instantiable virtual machine to reuse, via virtual image sharing, at least one portion of the master overloaded virtual image during deployment of the instantiable virtual machine within a service solution; identify, from the instantiable virtual machine part definition and part configuration metadata in response to determining to configure the instantiable virtual machine to reuse, via the virtual image sharing, the at least one portion of the master overloaded virtual image, a minimal executable virtual machine part core of the instantiable virtual machine that reuses, via the virtual image sharing, the at least one portion of the master overloaded virtual image during execution; and configure a minimal executable virtual machine part instantiable from the identified minimal executable virtual machine part core as the instantiable virtual machine to utilize, via the virtual image sharing, a shared resource within the master overloaded virtual image during execution.

A computer program product includes a computer readable storage medium having computer readable program code embodied therewith, where the computer readable program code when executed on a computer causes the computer to: receive an instantiable virtual machine part definition and part configuration metadata of an instantiable virtual machine capable of deployment as at least a portion of a service solution from a master overloaded virtual image; determine whether to configure the instantiable virtual machine to reuse, via virtual image sharing, at least one portion of the master overloaded virtual image during deployment of the instantiable virtual machine within a service solution; identify, from the instantiable virtual machine part definition and part configuration metadata in response to determining to configure the instantiable virtual machine to reuse, via the virtual image sharing, the at least one portion of the master overloaded virtual image, a minimal executable virtual machine part core of the instantiable virtual machine that reuses, via the virtual image sharing, the at least one portion of the master overloaded virtual image during execution; and configure a minimal executable virtual machine part instantiable from the identified minimal executable virtual machine part core as the instantiable virtual machine to utilize, via the virtual image sharing, a shared resource within the master overloaded virtual image during execution.

DETAILED DESCRIPTION

Figure 1:
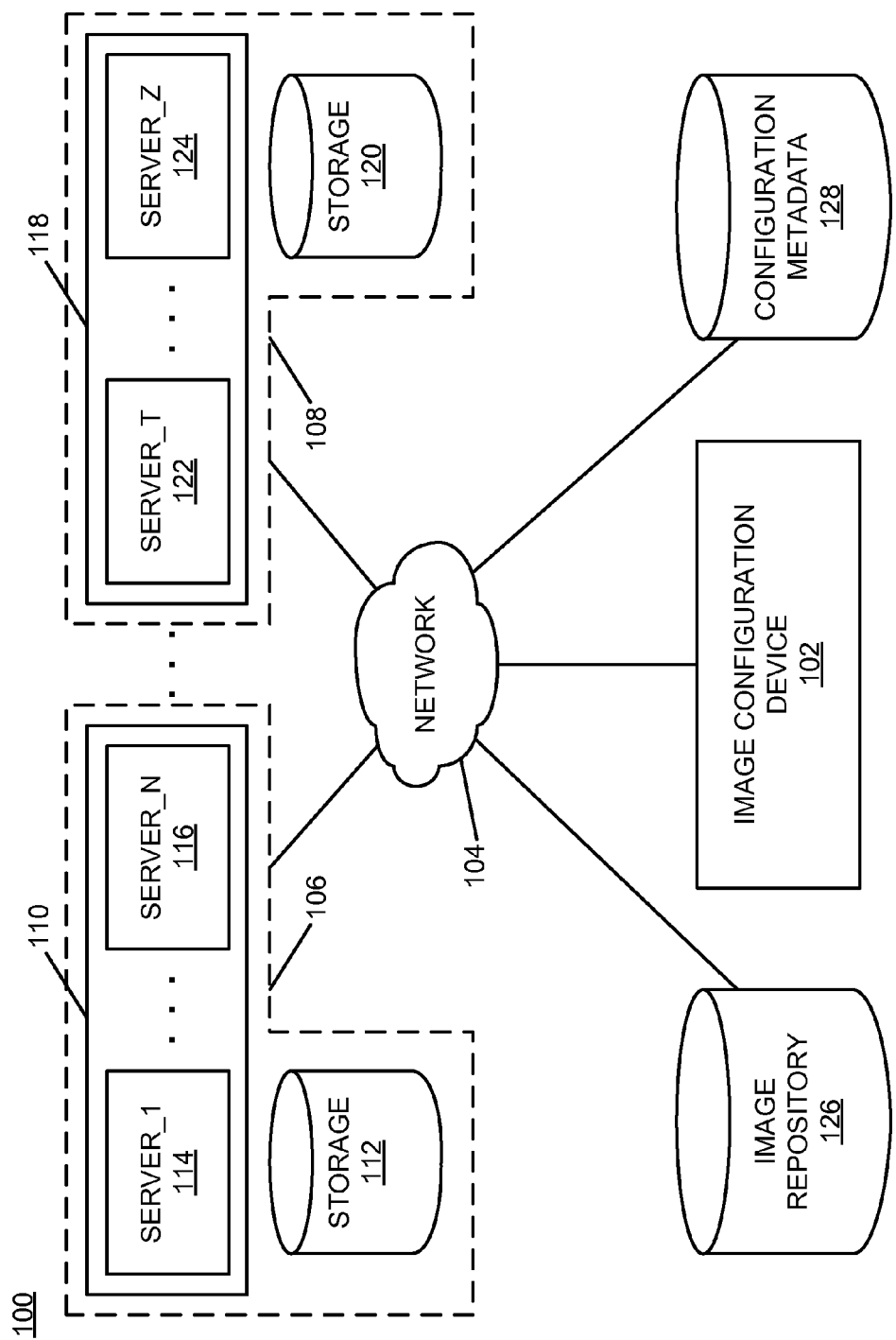
FIG. 1 is a block diagram of an example of an implementation of a system for virtual image overloading for solution deployment according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides virtual image overloading for solution deployment. The virtual image overloading for solution deployment may be used to design, deploy, and manage solutions without requiring multiple virtual images to be deployed. A single master overloaded virtual image includes multiple parts. Each part may be designed and instantiated to operate as a stand-alone virtual machine. Alternatively, each instantiated part may be designed to reuse at least a portion of the master overloaded virtual image during execution to reduce copying requirements during instantiation. Where a portion of the master overloaded virtual image is reused during execution, the respective part represents a configured minimal executable portion of a virtual machine designed to leverage reuse from the master overloaded virtual image. Each configured part may be instantiated to implement at least a portion of a service solution from the single master overloaded virtual image. Virtual image copying during deployment and virtual image proliferation may be reduced. Additionally, design, deployment, and management of service solutions may be improved.

To facilitate flexibility in deployment of solutions, parts may be created to be instantiated either as entire parts or as the minimal executable portions described above to leverage reuse from the master overloaded virtual image. Operational factors, such as performance, storage, and other factors, may be used to determine whether to instantiate entire parts or minimal executable portions with reuse during execution from the master overloaded virtual image(s). For example, where higher run-time performance is desired and storage and deploy-time performance are of lesser concern, entire parts may be instantiated. This may additionally facilitate improved recoverability. Alternatively, where run-time performance may be of lesser concern than deploy-time performance and storage requirements, minimal executable portions may be instantiated to leverage reuse from the master overloaded virtual image. As such, configuration of parts for deployment with solutions may be varied such that performance and storage tradeoffs, for example, may be varied to offer a range of solution performance and storage alternatives.

It should be understood that though the present description focuses on configuration and instantiation of either complete or minimal executable parts, parts that operate with some reuse along a continuum between completed parts and minimal executable parts may be used as appropriate for the given implementation. Accordingly, many variations on configuring parts for instantiation in association with solutions are possible and all are considered within the scope of the present subject matter. During deployment, a solution deployer may make a determination based upon client guidelines regarding performance, storage, and other criteria, as to whether to instantiate entire parts, minimal executable portions, or parts that are configured for a variation of one or more such criteria.

To alleviate virtual image copying and proliferation, the present subject matter provides a master overloaded virtual image that is preinstalled with software that may be used as the base for multiple solutions. This single master overloaded virtual image is preconfigured with "parts" for the different components of the solution and stored in an image repository. As such, the terminology "master overloaded virtual image" as used herein refer to a virtual image that includes more than one preconfigured part that may be instantiated in association with one or more servers associated with a hypervisor cloud to implement at least a portion of one or more solutions. As described below, additional master virtual images may also form a solution. These additional master virtual images may also include master overloaded virtual images.

Solution builders interact with abstractions of the parts within a solution design user interface to define one or more solutions, without knowledge that all of these parts may be sourced from the same master overloaded virtual image. When a solution deployer deploys one of the defined solutions, the master overloaded virtual image only needs to be transferred once from the repository (if it has not already been transferred). The master overloaded virtual image may then be started multiple times for each part in the solution, with the part information from which to select preconfigured profiles passed in as parameters. Platform specific technologies may be leveraged to optimize performance of starting of the same master overloaded virtual image as multiple virtual machines, all transparently from the perspective of the solution deployer and solution builder. As such, one master overloaded virtual image may be reused many times. Use of a single master overloaded virtual image provides improved tracking and maintenance, with reduced image proliferation. Deployment times may be improved because only a single image transfer is required and then platform performance optimizations may be transparently leveraged.

One master overloaded virtual image may be developed and shipped. This master overloaded virtual image may be preinstalled and preconfigured to support multi-machine solutions. For example, a typical portal server, such as Websphere® portal server (WPS), solution may include several WPS nodes in a cluster along with a database. This solution may be instantiated as multiple virtual machines. To support this solution, the master image includes all the code for WPS and a database management system, such as DB2®, along with preconfigured parts for WPS cluster nodes and DB2. Another example for an application server, such as Websphere® application server (WAS) may include pre-configured parts of a deployment manager, a custom node, a standalone node, a hypertext transfer protocol server, such as IBM® HTTP server (IHS), a job manager, etc. Capabilities (e.g., executable code segments, modules, etc.) may be included within the master overloaded virtual image to support instantiation. As such, one master overloaded virtual image may be stored into an image repository along with the capabilities to work with the parts in the image for instantiation of the respective parts of a given solution.

A solution designer may configure a specific solution by manipulating the parts within the master overloaded virtual image using a solution design interface application. The fact that there is only one underlying virtual image may be transparent to the solution designer. The solution deployer may define different solutions based upon the defined parts. For example, one solution may include a WPS cluster to DB2® as three virtual machines, and another solution may include a standalone WPS with DB2®. The solution deployer may select one of the defined solutions to deploy. If the base master overloaded virtual image has not previously been transferred to storage, such as a storage area network (SAN) or storage associated with one or more servers associated with a hypervisor cloud, it may be transferred at the time of deployment. Transparently to the solution deployer, the master overloaded virtual image may be instantiated by fast replication using platform specific technologies (e.g., VMware® linked clones, zVM flash copy, etc.) so that there are as many "copies" as needed to support the virtual machines that need to be started to implement the deployed solution. The virtual machines may be started with a parameter passed in for the preconfigured part. The parameter may include part information from which to select preconfigured profiles that is passed in as parameters. For example, one virtual image may be a WPS virtual machine and one may be a DB2® image. The solution deployer accesses the solution as three unique virtual machines with no knowledge that they are all based from the same master overloaded virtual image. The virtual machines may be available more rapidly than if they were sourced from three separate virtual images.

Parts may be designed based upon preconfigured profiles for a part, which are, in turn, based upon metadata that defines the respective parts. Instantiation of the parts may include selecting a preconfigured profile for a part by passing metadata that defines and selects the part from the master overloaded virtual image.

In addition to the details described above, the present subject matter combines packaging of the software stack for the various parts of a solution as master overloaded virtual images with metadata-based patterns and application scripts to describe a configuration. The patterns are platform agnostic and, as such, are without knowledge of the various hardware platforms. Both the patterns and scripts provide for deployment time parameterization. The master overloaded virtual images are platform dependent. However they expose platform independent parameterization that is used by the patterns. The patterns and scripts are platform independent. This platform agnostic pattern abstraction provides a mechanism to use the same pattern as the base for deployment across multiple platforms. As such, consistency across development, test, and production platforms may be improved. Accordingly, the same configurations may be used across different platforms for development through test to production.

For example, a pattern may be created to represent a WAS cell topology with session replication and high availability messaging. The pattern may be used with an image created for VMware®/Linux and deployed into a VMware® based pre-quality assurance (pre-QA) environment. After pre-QA testing, this same pattern may be selected for use with an image created for System p/AIX® PowerVM®. As such, the deployment may have an identical configuration, even for a different platform, based upon the metadata-based patterns and application scripts that describe the configuration. If this same pattern, deployed to a production environment, requires a slightly different configuration (e.g., the name of a database is different), a parameter may be added to the pattern that may be specified at deployment time. This allows the exact same pattern with just one parameter difference to be used from QA through production. The specific parameter may be recorded in the deployment to discern the difference between the two deployments.

As such, the present subject matter provides an efficient mechanism for managing repeatable and consistent deployment across the development life-cycle, particularly when these deployments span different platforms. The combination of master overloaded virtual images with patterns may also improve maintenance of deployed solutions. If a working pre-QA VMware® environment is deployed, an identical solution deployment within a different environment may be efficiently deployed, without requiring installation of an operating system (OS), installation of middleware, or redoing topology definitions or application configurations.

To support cross-platform portability, master overloaded virtual images of a product/solution are created for each different target platform. As described above, master overloaded virtual images include preinstalled and preconfigured versions of the product, specifically optimized for each platform, and/or preconfigured parts for one or more solutions. The preconfigured parameters to the master overloaded virtual images are exposed as metadata. Metadata patterns are provided with capabilities to customize the patterns for common configurations of the product. For example, cluster patterns may be implemented via metadata. Parameters may be added to the pattern for variables that may be different each time the pattern is deployed. An identical pattern may be reused for different stages in the development lifecycle. The pattern may initially be deployed into a pre-QA environment that is on VMware®. When the pattern topology is instantiated for VMware®, the master VMware® image is used. The pattern topology configuration is constructed by passing the pattern parameters into the master VMware® image. When moving to a QA test cycle on PowerVM®, the identical pattern topology may be used, with no changes. For QA, a parameter for a test and development database may be used. When the pattern topology is instantiated for AIX®, the master AIX® PowerVM® image is used again and the pattern topology configuration is constructed by passing the identical pattern parameters into the master AIX® PowerVM® image. When moving to production on an AIX® platform, the identical pattern topology may be used, with no changes. The only difference is the parameter for the database of the respective platform. This facilitates repeatability and consistency of solution deployments. When the pattern topology is instantiated for an AIX® production environment, the identical master AIX® PowerVM® image may be used with reduced installation and configuration activities. Again, the repeatable pattern topology configuration is constructed by passing the identical pattern parameters into the master AIX® PowerVM® image.

It should be noted that while the present subject matter is directed to virtual image overloading where one or more solutions is associated as a collection of instantiable parts within a single master overloaded virtual image, the aspect of using a single master overloaded virtual image should not be considered limiting. For example, where one or more components are used less often than other components in deployed solutions (e.g., a directory server may not always form a part of a deployed solution), a part for each of the less-used components may be associated with one or more separate virtual images (each may also be overloaded virtual images) that are deployed in association with the primary master overloaded virtual image. In such a situation, connections may be established between multiple virtual images and the associated instantiated parts to implement a single deployed solution. Again, metadata may be used to define how parts may be put together to form a solution. Pattern abstractions define what parts may be selected and how they may be interconnected. As described above, these patterns may be implemented on multiple platforms based upon one or more parts selected from one or more master overloaded virtual images. As such, deployment time for solutions where all parts are included in a single master overloaded virtual image may be improved by associating less-used parts with different virtual images. By partitioning the less-used parts to different virtual images, master overloaded virtual images for solutions that do not instantiate the respective parts may be smaller and copied faster. Virtual images including the less-used parts may be copied as needed for a given solution that instantiates the respective part(s).

The virtual image overloading for solution deployment described herein may be performed in real time to allow prompt deployment of solutions via a master overloaded virtual image. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second, within a few seconds, within a few minutes, etc.). These terms, while difficult to precisely define are well understood by those skilled in the art.

FIG. 1 is a block diagram of an example of an implementation of a system 100 for virtual image overloading for solution deployment. An image configuration device 102 communicates via a network 104 with devices associated with a hypervisor cloud 106 and with devices associated with a hypervisor cloud 108.

As will be described in more detail below in association with FIG. 2 through FIG. 6, the image configuration device 102 provides automated virtual image overloading for solution deployment. The automated virtual image overloading for solution deployment is based upon associating multiple pre-configured parts with one or more master overloaded virtual images. The automated virtual image overloading for solution deployment provides enhanced solution design, deployment, and life-cycle management.

It should be noted that the image configuration device 102 may be any computing device capable of processing information as described above and in more detail below. For example, the image configuration device 102 may include devices such as a server, a personal computer (e.g., desktop, laptop, palm, etc.), or a handheld device (e.g., cellular telephone, personal digital assistant (PDA), etc.), or any other device capable of processing information as described in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The hypervisor cloud 106 includes a hypervisor platform 110 and a storage device 112. The hypervisor platform 110 includes a server_1 114 through a server_N 116 that each represent servers supporting a virtual hypervisor platform within the hypervisor cloud 106 to each support at least one virtual machine. Similarly, the hypervisor cloud 108 includes a hypervisor platform 118 and a storage device 120. The hypervisor platform 118 includes a server_T 122 through a server_Z 124 that each represent servers supporting a virtual hypervisor platform within the hypervisor cloud 108 to each support at least one virtual machine. It is understood that the hypervisor platform associated with each of the hypervisor cloud 106 and the hypervisor cloud 108 may be different or identical based upon the given implementation. For purposes of the present example, they are assumed to represent different hypervisor platforms (e.g., VMware®, AIX® PowerVM®, etc.).

It should be understood that the storage device 112 and the storage device 120 may include any form of storage appropriate for a given implementation. For example, the storage device 112 and/or the storage device 120 may include storage such as a storage area network (SAN), storage associated with one or more servers within a hypervisor cloud, or other storage device(s) without departure from the scope of the present subject matter. Additionally, each of the server_1 114 through the server_N 116 and the server_T 122 through the server_Z 124 may support and/or host multiple virtual machines. Where appropriate for a given implementation, an entire solution may be implemented on a single server, such as one of the server_1 114 through the server_N 116 and/or the server_T 122 through the server_Z 124.

An image repository 126 stores master overloaded virtual images created by the image configuration device 102 prior to deployment. Deployed master overloaded virtual images are copied during or prior to deployment to the storage device 112 and the storage device 120 for the hypervisor platform 110 and the hypervisor platform 118, respectively.

A configuration metadata storage device 128 stores configuration metadata created by the image configuration device 102 for selection of parts associated with master overloaded virtual images for the respective hypervisor platforms. As described above, the configuration metadata may include part information from which to select preconfigured parameters (e.g., preconfigured profiles) that is passed into the master overloaded virtual images as parameters. The configuration metadata may also include platform agnostic patterns (as metadata), configuration parameters, scripts, passwords, and other information associated with creation, deployment, and management of solutions using master overloaded virtual images as described herein.

As also described above, platform specific technologies may be leveraged to optimize performance of starting of the same master overloaded virtual image as multiple virtual machines associated with one or more servers. The respective parts may be instantiated within the respective hypervisor platforms to implement a deployed solution.

It should also be noted that while the storage device 112, the storage device 120, the image repository 126, and the configuration metadata storage device 128 are shown as databases generally, they may each include one or more storage locations. Additionally, they may each include storage organized as a database, a file system, or any other form of storage appropriate for a given implementation, including without limitation a storage area network.

Figure 2:
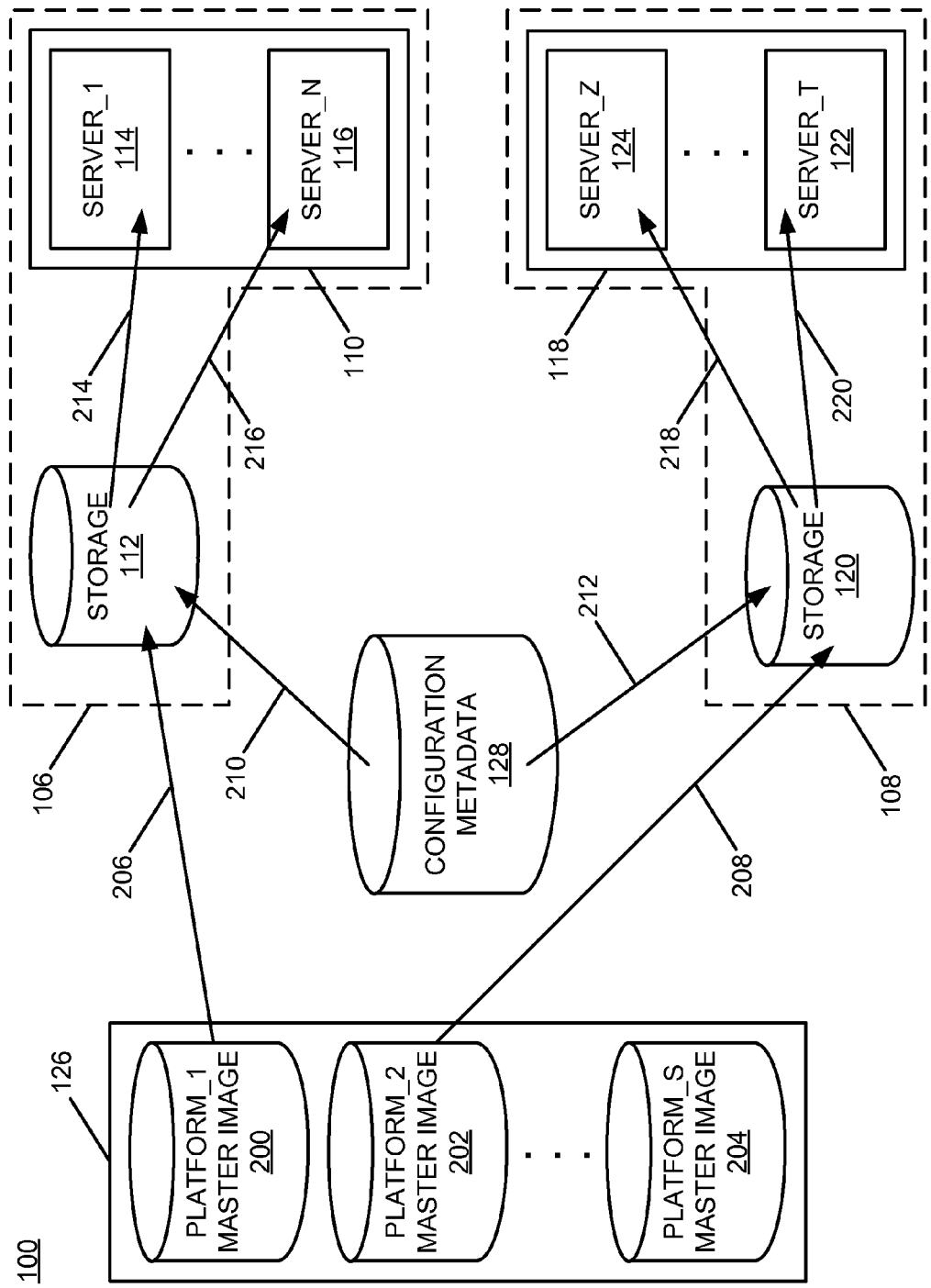
FIG. 2 is a logical flow block diagram of an example of an implementation of portions of the system of FIG. 1 for virtual image overloading for solution deployment according to an embodiment of the present subject matter.

FIG. 2 is a logical flow block diagram of an example of an implementation of portions of the system 100 of FIG. 1 for virtual image overloading for solution deployment. Several of the components of FIG. 1 are shown within FIG. 2. The network 104 and the image configuration device 102 are omitted for brevity. However, it is understood that the virtual image overloading for solution deployment is performed under the control of the image configuration device 102 within the present example. As can be seen from FIG. 2, the image repository 126 includes a platform_1 master image 200, a platform_2 master image 202, through a platform_S master image 204. The respective platforms associated with the platform_1 master image 200, the platform_2 master image 202, through the platform_S master image 204 may include, for example, VMware®, AIX® PowerVM®, Z Series® hypervisor platforms, or other platforms.

As described above, master overloaded virtual images may be created for each hypervisor platform upon which a solution or set of solutions associated with one or more master overloaded virtual images may be deployed. As such, for purposes of the present example, each of the platform_1 master image 200, platform_2 master image 202, through a platform_S master image 204 represent one or more master overloaded virtual images for different platforms.

Additionally, for purposes of the present example, the platform_1 master image 200 is associated with the hypervisor platform 110 within the hypervisor cloud 106. Similarly, the platform_2 master image 202 is associated with the hypervisor platform 118 within the hypervisor cloud 108. However, it should be noted that the platform_1 master image 200 and the platform_2 master image 202 may represent either a same solution or set of solutions based upon the same platform agnostic pattern or may be based upon one or more different patterns without departure from the scope of the present subject matter.

The image configuration device 102 (see FIG. 1) may deploy the platform_1 master image 200 automatically via the network 104 (see FIG. 1) to the hypervisor cloud 106 by initially storing the platform_1 master image 200 within the storage device 112, either prior to or at a time of deployment. Deployment of the platform_1 master image 200 to the storage device 112 is represented by an arrow 206. Similarly, copying of the platform_2 master image 202 to the storage device 120 for deployment to the hypervisor cloud 108 is represented by an arrow 208.

To initiate instantiation of parts, the image configuration device 102 applies metadata stored within the configuration metadata storage device 128 to each of the platform_1 master image 200 and the platform_2 master image 202 that are stored within the storage device 112 and the storage device 120, respectively. An arrow 210 and an arrow 212 represent application of metadata by the image configuration device 102 to the platform_1 master image 200 and the platform_2 master image 202, respectively.

As described above, the metadata may include part information from which to select preconfigured profiles that is passed in as parameters to the respective overloaded virtual master images to identify parts to be instantiated in association with one or more servers configured as virtual machine hosts within the respective hypervisor clouds. An arrow 214 and an arrow 216 represent instantiation of parts associated with a solution in association with the server_1 114 through the server_N 116 within the hypervisor platform 110 based upon the platform_1 master image 200. An arrow 218 and an arrow 220 also represent part instantiation associated with a solution in association with the server_Z 124 through the server_T 122 within the hypervisor platform 118 based upon the platform_2 master image 202.

Accordingly, the image configuration device 102 may copy one or more master overloaded virtual images from an image repository, such as the image repository 126, to storage associated with a given hypervisor cloud. Each part associated with a given solution may be selected from the master overloaded virtual image(s) and instantiated in association with host devices (e.g., servers) operating with a given hypervisor platform by application of metadata including patterns, profiles, parameters, and scripts to the respective master overloaded virtual image(s).

Figure 3:
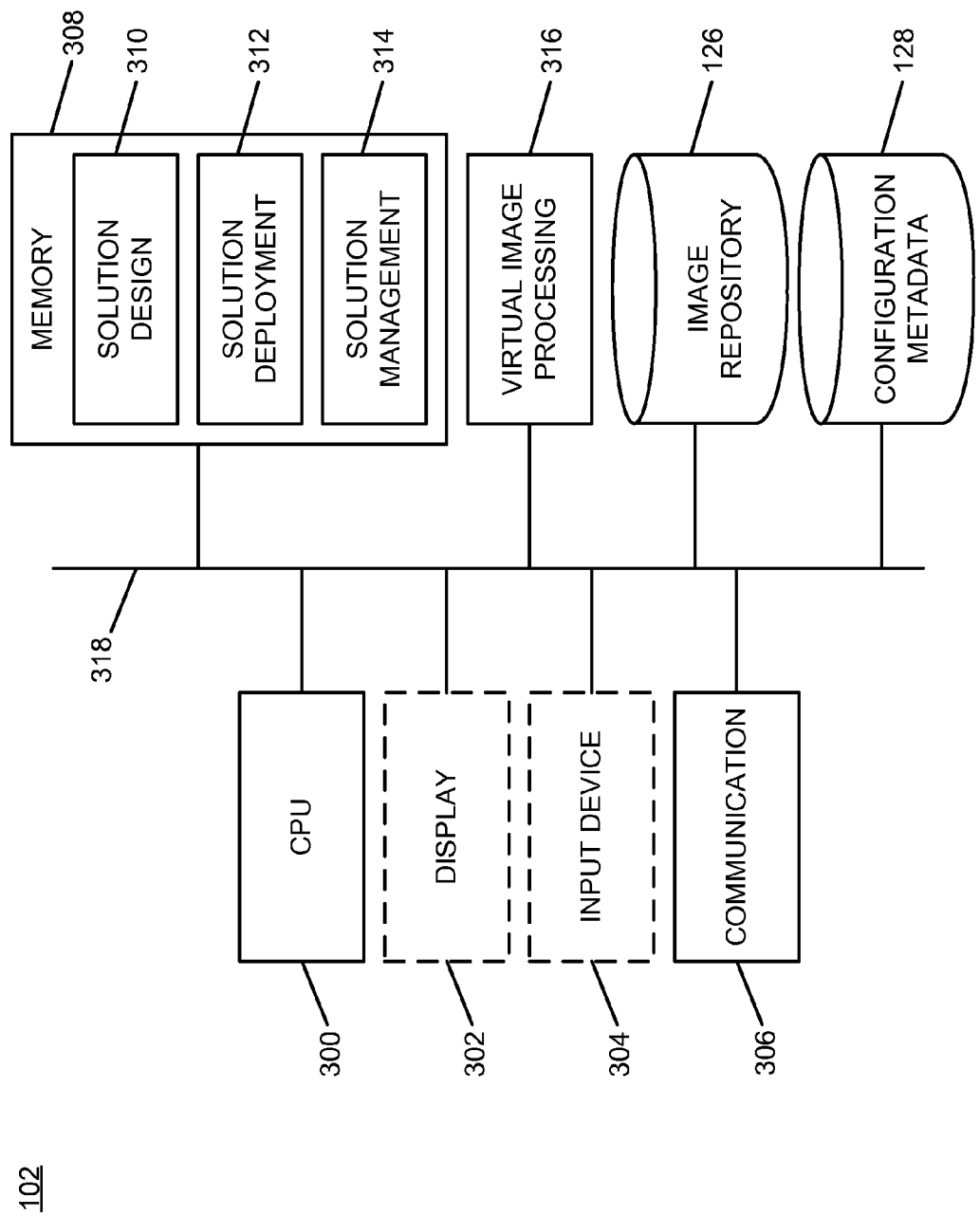
FIG. 3 is a block diagram of an example of an implementation of an image configuration device capable of performing automated virtual image overloading for solution deployment according to an embodiment of the present subject matter.

FIG. 3 is a block diagram of an example of an implementation of the image configuration device 102 capable of performing automated virtual image overloading for solution deployment. A central processing unit (CPU) 300 provides computer instruction execution, computation, and other capabilities within the image configuration device 102. A display 302 provides visual information to a user of the image configuration device 102 and an input device 304 provides input capabilities for the user.

The display 302 may include any display device, such as a cathode ray tube (CRT), liquid crystal display (LCD), light emitting diode (LED), projection, touchscreen, or other display element or panel. The input device 304 may include a computer keyboard, a keypad, a mouse, a pen, a joystick, or any other type of input device by which the user may interact with and respond to information on the display 302.

It should be noted that the display 302 and the input device 304 are illustrated with a dashed-line representation within FIG. 3 to indicate that they may be optional components for the image configuration device 102 for certain implementations. For example, for solution design and testing, the display 302 and the input device 304 may be used by a solution designer. For solution deployment, the image configuration device 102 may operate in an automated manner to copy master overloaded virtual images to hypervisor clouds and to instantiate and start the respective parts that form the deployed solution. Additionally, solution management may include user feedback and input for changes to deployed solutions. Accordingly, the image configuration device 102 may operate as a completely automated embedded device without user configurability or feedback. However, the image configuration device 102 may also provide user feedback and configurability via the display 302 and the input device 304, respectively.

A communication module 306 provides interconnection capabilities that allow the image configuration device 102 to communicate with other modules within the system 100, such as components described above within the hypervisor cloud 106 and the hypervisor cloud 108, to implement the virtual image overloading for solution deployment described herein. The communication module 306 may include any electrical, protocol, and protocol conversion capabilities useable to provide the interconnection capabilities. Though the communication module 306 is illustrated as a component-level module for ease of illustration and description purposes, it should be noted that the communication module 306 may include any hardware, programmed processor(s), and memory used to carry out the functions of the communication module 306 as described above and in more detail below. For example, the communication module 306 may include additional controller circuitry in the form of application specific integrated circuits (ASICs), processors, antennas, and/or discrete integrated circuits and components for performing communication and electrical control activities associated with the communication module 306. Additionally, the communication module 306 may include interrupt-level, stack-level, and application-level modules as appropriate. Furthermore, the communication module 306 may include any memory components used for storage, execution, and data processing for performing processing activities associated with the communication module 306. The communication module 306 may also form a portion of other circuitry described without departure from the scope of the present subject matter.

A memory 308 includes a solution design storage area 310 that stores design information associated with design and development of parts and solutions for the image configuration device 102. For example, patterns, profiles, parameters, and scripts may all be stored within the solution design storage area 310 throughout solution design, then stored for example to the configuration metadata storage device 128 for testing and deployment.

A solution deployment storage area 312 stores information associated with solution deployment, such as information identifying a solution to be deployed, information identifying a master overloaded virtual image stored in the image repository 126 for deployment, and information identifying a hypervisor cloud to which the identified solution is to be deployed. A solution management storage area 314 stores information associated with solution management for deployed solutions. The information stored within the solution management storage area 314 may include performance monitoring and tracking information associated with deployed solutions.

Though the present example shows the solution design storage area 310, the solution deployment storage area 312, and the solution management storage area 314 as separate storage areas within the memory 308, this should not be considered limiting. A single storage area within a single memory, or alternatively multiple memories, may be used as appropriate for a given implementation. It is also understood that the memory 308 may include any combination of volatile and non-volatile memory suitable for the intended purpose, distributed or localized as appropriate, and may include other memory segments not illustrated within the present example for ease of illustration purposes. For example, the memory 308 may include a code storage area, a code execution area, and a data area without departure from the scope of the present subject matter.

A virtual image processing module 316 is also illustrated. The virtual image processing module 316 provides the processing capabilities for the image configuration device 102, as described above and in more detail below. The virtual image processing module 316 implements the automated virtual image overloading for solution deployment of the image configuration device 102.

Though the virtual image processing module 316 is illustrated as a component-level module for ease of illustration and description purposes, it should be noted that the virtual image processing module 316 may include any hardware, programmed processor(s), and memory used to carry out the functions of this module as described above and in more detail below. For example, the virtual image processing module 316 may include additional controller circuitry in the form of application specific integrated circuits (ASICs), processors, and/or discrete integrated circuits and components for performing communication and electrical control activities associated with the respective devices. Additionally, the virtual image processing module 316 may also include interrupt-level, stack-level, and application-level modules as appropriate. Furthermore, the virtual image processing module 316 may include any memory components used for storage, execution, and data processing for performing processing activities associated with the module.

It should also be noted that the virtual image processing module 316 may form a portion of other circuitry described without departure from the scope of the present subject matter. Further, the virtual image processing module 316 may alternatively be implemented as an application stored within the memory 308. In such an implementation, the virtual image processing module 316 may include instructions executed by the CPU 300 for performing the functionality described herein. The CPU 300 may execute these instructions to provide the processing capabilities described above and in more detail below for the image configuration device 102. The virtual image processing module 316 may form a portion of an interrupt service routine (ISR), a portion of an operating system, a portion of a browser application, or a portion of a separate application without departure from the scope of the present subject matter.

The image repository 126 and the configuration metadata storage device 128 are illustrated within FIG. 3 to show that the respective storage areas may alternatively be associated with the image configuration device 102 rather than accessed via the network 104.

The CPU 300, the display 302, the input device 304, the communication module 306, the memory 308, the virtual image processing module 316, the image repository 126, and the configuration metadata storage device 128 are interconnected via an interconnection 318. The interconnection 318 may include a system bus, a network, or any other interconnection capable of providing the respective components with suitable interconnection for the respective purpose.

While the image configuration device 102 is illustrated with and has certain components described, other modules and components may be associated with the image configuration device 102 without departure from the scope of the present subject matter. Additionally, it should be noted that, while the image configuration device 102 is described as a single device for ease of illustration purposes, the components within the image configuration device 102 may be co-located or distributed and interconnected via a network without departure from the scope of the present subject matter. For a distributed arrangement, the display 302 and the input device 304 may be located within a development lab, at a kiosk, or at another location, while the CPU 300 and memory 308 may be located at a local or remote server. Many other possible arrangements for components of the image configuration device 102 are possible and all are considered within the scope of the present subject matter. It should also be understood that, though the image repository 126 and the configuration metadata storage device 128 are shown as stand-alone components of the image configuration device 102, they may also be stored within the memory 308 without departure from the scope of the present subject matter. Accordingly, the image configuration device 102 may take many forms and may be associated with many platforms.

Figure 4:
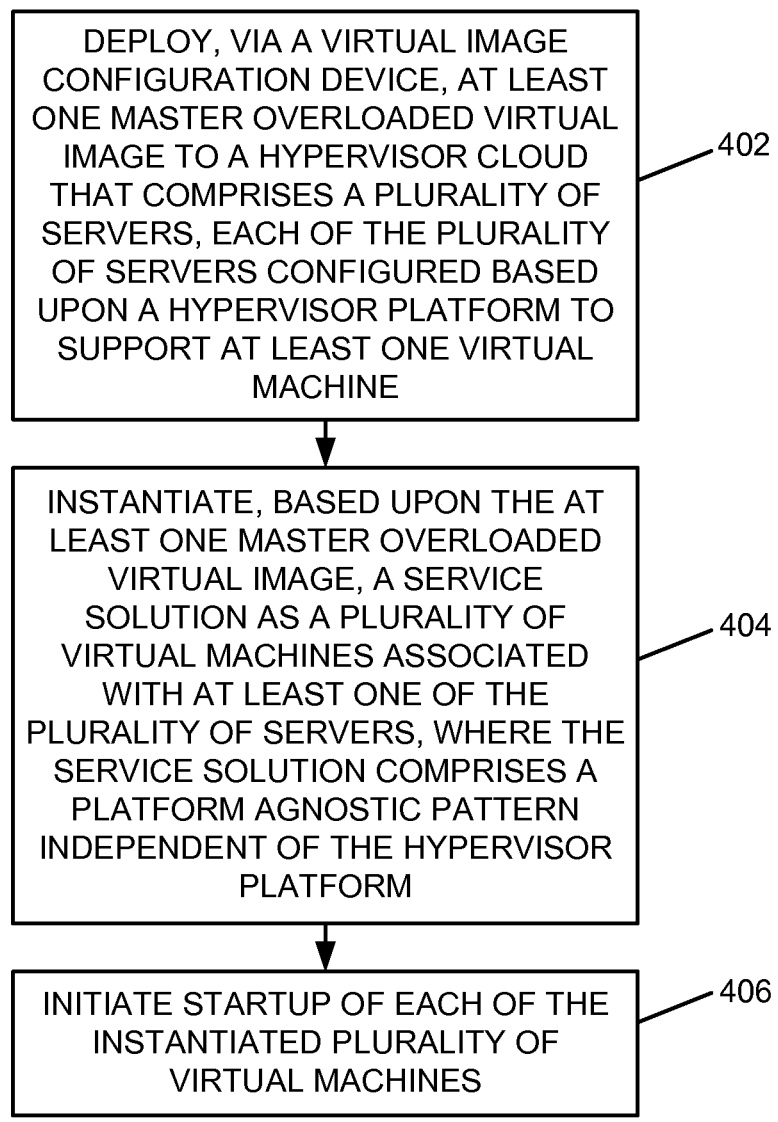
FIG. 4 is a flow chart of an example of an implementation of a process for automated virtual image overloading for solution deployment according to an embodiment of the present subject matter.
Figure 5:
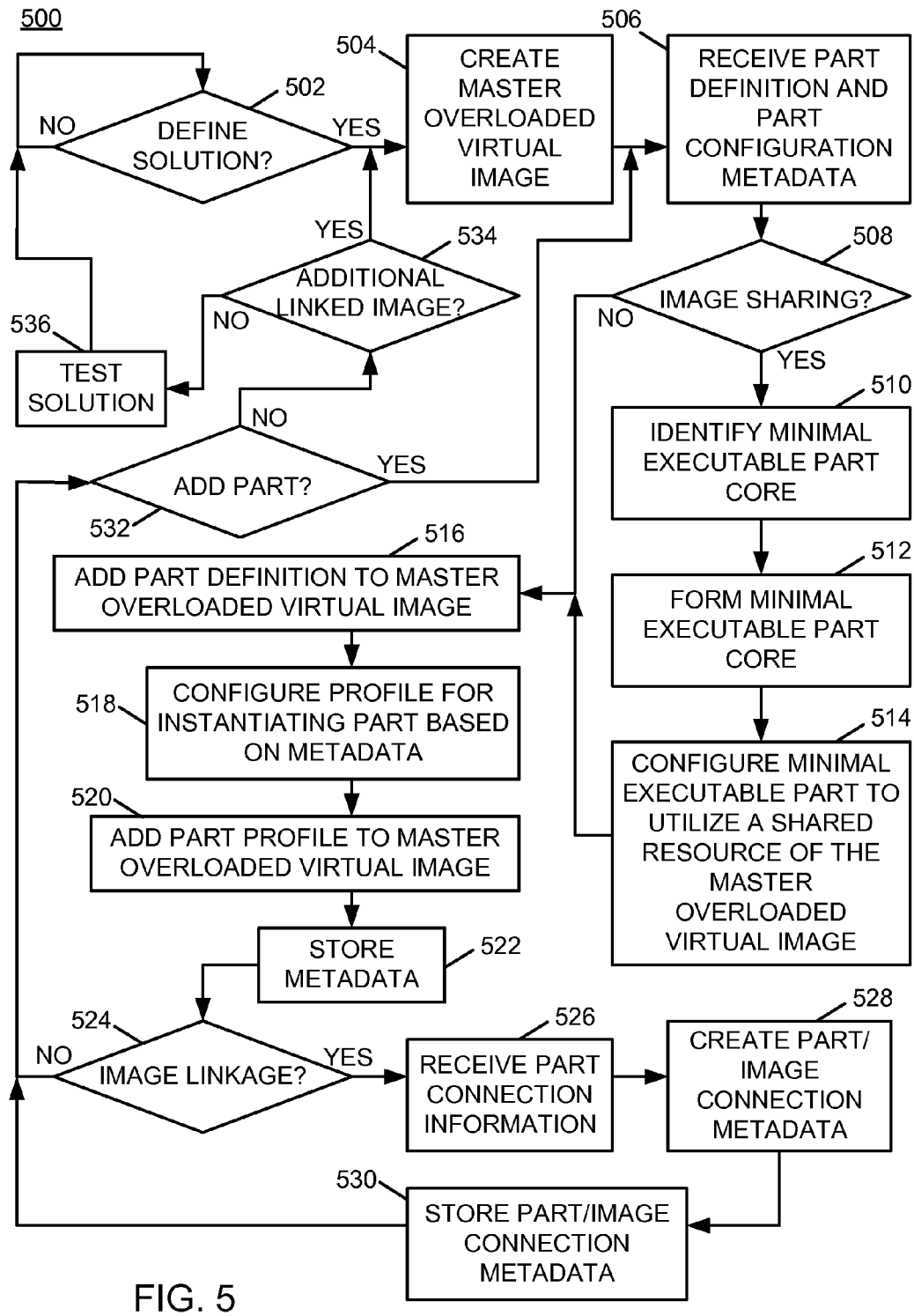
FIG. 5 is a flow chart of an example of an implementation of a process for defining solutions and design of master overloaded virtual images for automated virtual image overloading for solution deployment according to an embodiment of the present subject matter.
Figure 6:
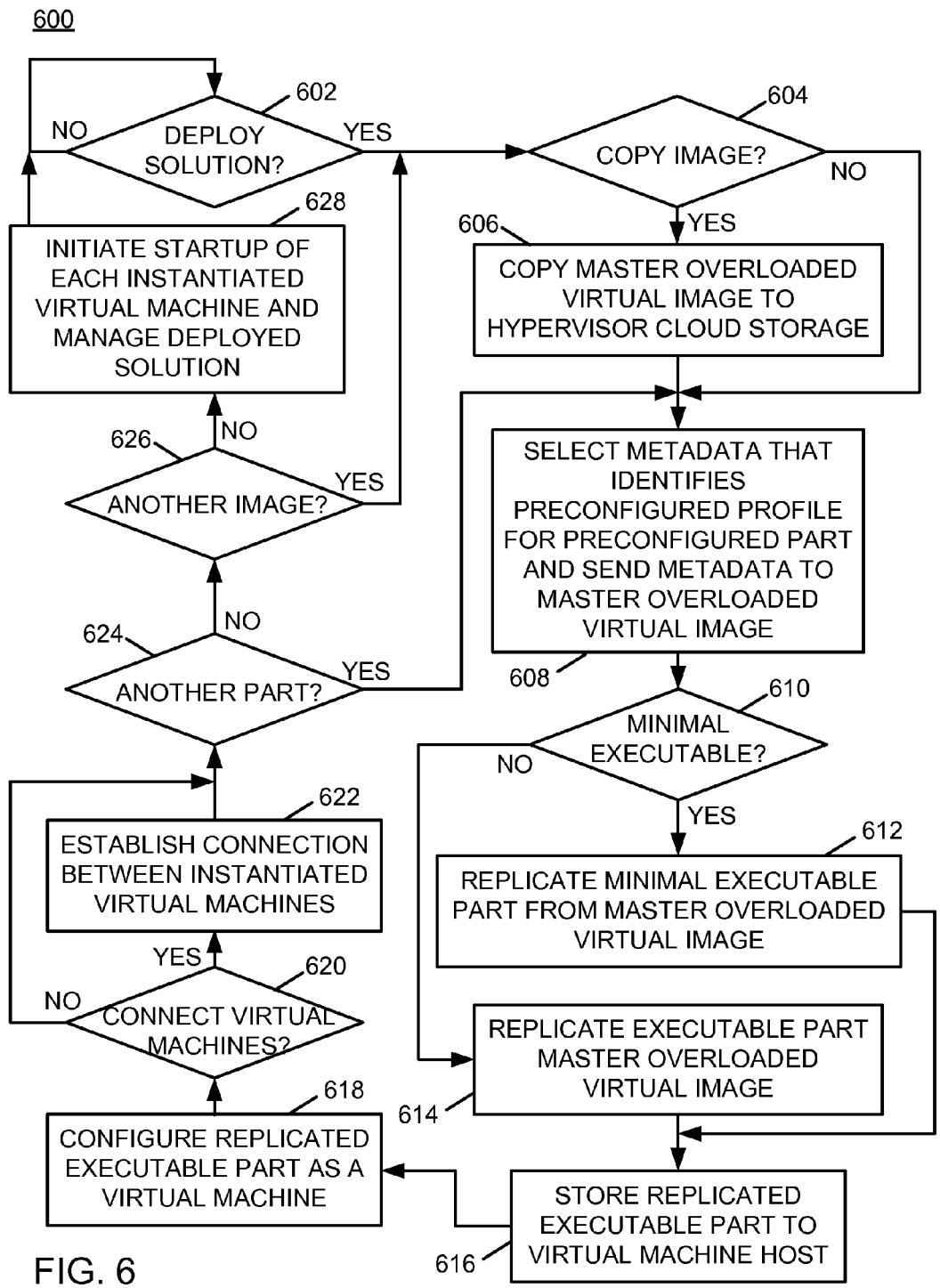
FIG. 6 is a flow chart of an example of an implementation of a process for deployment of master overloaded virtual images for automated virtual image overloading for solution deployment according to an embodiment of the present subject matter.

FIG. 4 through FIG. 6 below describe example processes that may be executed by such devices, such as the image configuration device 102, to perform the automated virtual image overloading for solution deployment associated with the present subject matter. Many other variations on the example processes are possible and all are considered within the scope of the present subject matter. The example processes may be performed by modules, such as the virtual image processing module 316 and/or executed by the CPU 300, associated with such devices. It should be noted that time out procedures and other error control procedures are not illustrated within the example processes described below for ease of illustration purposes. However, it is understood that all such procedures are considered to be within the scope of the present subject matter.

FIG. 4 is a flow chart of an example of an implementation of a process 400 for automated virtual image overloading for solution deployment. At block 402, the process 400 deploys, via a virtual image configuration device, at least one master overloaded virtual image to a hypervisor cloud that comprises a plurality of servers, each of the plurality of servers configured based upon a hypervisor platform to support at least one virtual machine. At block 404, the process 400 instantiates, based upon the at least one master overloaded virtual image, a service solution as a plurality of virtual machines associated with at least one of the plurality of servers, where the service solution comprises a platform agnostic pattern independent of the hypervisor platform. At block 406, the process 400 initiates startup of each of the instantiated plurality of virtual machines.

FIG. 5 is a flow chart of an example of an implementation of a process 500 for defining solutions and design of master overloaded virtual images for automated virtual image overloading for solution deployment. It should be noted that the present example process 500 combines a single solution definition with design and creation of multiple master overloaded virtual images for ease of description purposes. However, as described above, multiple solutions may be associated with a single master overloaded virtual image. Additionally, multiple master overloaded virtual images may be created, for example, where one solution associated with a multi-solution master overloaded virtual image utilizes a component (e.g., a directory server), and other solutions within the multi-solution master overloaded virtual image do not utilize this component. Further, these multiple solutions may each be based upon a different platform agnostic pattern. These platform agnostic patterns may be implemented for different hypervisor platforms via creation of a different master overloaded virtual image for each such hypervisor platform. As such, for purposes of the present example, a single platform agnostic pattern associated with a single solution to be deployed within one or more master overloaded virtual images is assumed. However, it should be understood that many variations on the present example process 500 are possible based upon the description herein and all are considered within the scope of the present subject matter.

At decision point 502, the process 500 makes a determination as to whether an indication to define a solution has been detected or received. For example, an indication to define a solution may be detected or received from a user of the image configuration device 102, either via the network 104 or via the input device 304. As described above, the solution may include a platform agnostic pattern that is independent of the hypervisor platform to which it is to be deployed. This independence allows reuse of the platform agnostic pattern across multiple hypervisor platforms by creation of a master overloaded virtual image for each such hypervisor platform.

When a determination is made at decision point 502 that an indication to define a solution has been detected or received, the process 500 creates an initial master overloaded virtual image at block 504. It should be understood that a master overloaded virtual image may already be created and modified in association with the process 500 for definition of additional parts in association with the master overloaded virtual image and/or a solution. As such, the processing at block 504 to create the initial master overloaded virtual image is for ease of illustration purposes only and may be changed to "select" a master overloaded virtual image as appropriate for a given implementation without departure from the scope of the present subject matter.

At block 506, the process 500 receives a part definition and part configuration metadata for a first part. As described in more detail below, the process 500 iterates to allow definition and configuration metadata to be received for multiple parts in association with a single master overloaded virtual image. The part definition and part configuration metadata for each part may be received, for example, alternatively via the network 104 or via the input device 304.

At decision point 508, the process 500 makes a determination as to whether image sharing is to be utilized for the part. As described above, image sharing may be implemented by reuse of portions of the master overloaded virtual image. This reuse aspect of the master overloaded virtual image provides for definition of minimal executable parts that may be instantiated as virtual machines that reuse portions of the master overloaded virtual image rather than creating larger monolithic parts that require more copy and instantiation time and bandwidth. As also described above, during deployment, a solution deployer may make a determination based upon client guidelines regarding performance, storage, and other criteria, as to whether to instantiate entire parts, minimal executable portions, or parts that are configured for a variation of one or more such criteria. As such, the determination at decision point 508 may include making a determination as to a set of configuration options to be made available for a part at a time of deployment, including full part, minimal executable part, or parts that are configured for a variation of one or more criteria, such as performance, storage, or other criteria.

When a determination is made at decision point 508 to utilize image sharing for the part, the process 500 identifies a minimal executable part core at block 510. At block 512, the process forms the minimal executable part core. At block 514, the process 500 configures the minimal executable part to utilize a shared resource of the master overloaded virtual image.

In response to completion of configuration of the minimal executable part at block 514 or upon a determination not to implement image sharing for the part at decision point 508, the process 500 adds the part definition to the master overloaded virtual image at block 516. As described above, adding the part definition may include adding a complete part definition including one or more configuration options for instantiation of parts, such as for example, a minimal executable part. At block 518, the process 500 configures a profile for instantiating the part based upon the received metadata, including instantiation of either a complete part or a minimal executable part. At block 520, the process 500 adds the profile to the master overloaded virtual image. At block 522, the process 500 stores the metadata for use during instantiation of the part from the master overloaded virtual image during deployment. As described above, the metadata for instantiation of parts from the master overloaded virtual image may be stored separately from the master overloaded virtual image. Further, the storage of the metadata for use during instantiation of the part from the master overloaded virtual image during deployment may be stored via a device, such as the configuration metadata storage device 128 or other device, as appropriate for a given implementation.

At decision point 524, the process 500 makes a determination as to whether to create an image linkage for the part with a part associated with a different master overloaded virtual image. It should be noted that at least the first iteration of the process 500 will result in a false indication unless a previously-created master overloaded virtual image is referenced. For subsequent iterations or where a previously-created overloaded virtual image is referenced, part connections between multiple master overloaded virtual images may be formed and used to implement operational connections between parts instantiated from the respective parts associated with the multiple master overloaded virtual images. For purposes of the present example, it is assumed that all master overloaded virtual images for a given solution are created during a single execution of the process 500.

When a determination is made at decision point 524 to create an image linkage for the part with a part associated with a different master overloaded virtual image, the process 500 receives part connection information at block 526. At block 528, the process 500 creates part/image connection metadata. At block 530, the process 500 stores the part/image connection metadata for use during instantiation of parts in association with solution deployment. As described above, the metadata may be stored separately from the master overloaded virtual image. Further, the storage of the metadata may be stored via a device, such as the configuration metadata storage device 128 or other device, as appropriate for a given implementation.

Upon completion of storage of the metadata for part/image connectivity at block 530 or upon a determination not to create an image linkage for the part with a part associated with a different master overloaded virtual image at decision point 524 (e.g., during at least the first iteration of the process 500), the process 500 makes a determination as to whether to add another part to the master overloaded virtual image at decision point 532. When a determination is made to add an additional part to the master overloaded virtual image, the process 500 returns to block 506 and iterates as described above.

When a determination is made not to add an additional part to the master overloaded virtual image, the process 500 makes a determination at decision point 534 as to whether to create an additional linked master overloaded virtual image for the solution. When a determination is made to create an additional linked master overloaded virtual image for the solution, the process 500 returns to block 504 and iterates as described above.

When a determination is made not to create an additional linked master overloaded virtual image for the solution at decision point 534, the process 500 tests the solution at block 536. For ease of illustration, a detailed description of the testing process is omitted. However, it is understood that testing may involve deployment of the master overloaded virtual image, instantiation of parts to form the solution, and testing of the solution implementation. These testing procedures may be performed on a quality assurance platform associated with a development laboratory or other infrastructure as appropriate for a given implementation. Upon completion of testing of the solution, the process 500 returns to decision point 502 to await an indication to define a new solution.

As such, the process 500 provides for creation of one or more master overloaded virtual images associated with a solution that is based upon a platform agnostic pattern. Minimal executable portions of parts may be created and configured to reuse portions of a master overloaded virtual image. Where multiple master overloaded virtual images are utilized to form a solution, connections between parts across multiple overloaded virtual images may be formed to allow operational connections between instantiated parts.

Additionally, as described above, similar processing to that described above for the process 500 may be performed for part selection by a solution builder to define a solution from one or more existing master overloaded virtual images. This additional processing is not illustrated for brevity. However, it is understood that such a process for selecting parts from one or more previously-created master overloaded virtual images to form a solution may include loading one or more master virtual images into a solution design user interface application. As described above, solution builders interact with abstractions of the parts within a solution design user interface to define one or more solutions, without knowledge that all of these parts may be sourced from the same master overloaded virtual image. Parts may be selected by the solution builder and combined to form a solution. Metadata that defines the respective parts, as described above, may be selected for instantiation of the selected parts and stored in association with the solution definition. This solution definition may be selected for deployment, as described for example, in association with FIG. 6 below.

FIG. 6 is a flow chart of an example of an implementation of a process 600 for deployment of master overloaded virtual images for automated virtual image overloading for solution deployment. At decision point 602, the process 600 makes a determination as to whether an indication to deploy a solution has been detected or received. For example, an indication to deploy a solution may be detected or received from a user of the image configuration device 102, either via the network 104 or via the input device 304. The indication to deploy the solution may also include an identifier associated with one or more master overloaded virtual images by which the solution is to be deployed.

When a determination is made at decision point 602 that an indication to deploy a solution has been detected or received, the process 600 makes a determination at decision point 604 as to whether to copy an identified master overloaded virtual image to a hypervisor cloud storage associated with a hypervisor cloud within which the solution is to be deployed. As described above, a master overloaded virtual image may already be stored in association with a hypervisor cloud. In such a situation, deployment of a solution may be expedited. When a determination is made to copy the identified master overloaded virtual image to the hypervisor cloud storage, the process 600 copies an identified master overloaded virtual image to the hypervisor cloud storage associated with the hypervisor cloud within which the solution is to be deployed at block 606. The hypervisor cloud storage may include, for example a storage device such as the storage device 112 or the storage device 120.

Upon completion of copying the master overloaded virtual image to the hypervisor cloud storage at block 606 or upon making a determination that the master overloaded virtual image is already stored in association with the hypervisor cloud storage, the process 600 begins instantiation of virtual machines associated with the solution by selecting metadata that identifies a preconfigured profile for a first preconfigured instantiable part associated with the first identified master overloaded virtual image and sends the selected metadata to the deployed master overloaded virtual image at block 608. As described above, each preconfigured profile associated with a master overloaded virtual images defines a virtual machine associated with the solution.

At decision point 610, the process 600 makes a determination as to whether the part (e.g., a first part for a first iteration) to be instantiated in association with the solution is to be instantiated as a minimal executable part with resources sharing within the master overloaded virtual image. When a determination is made to instantiate a minimal executable part at decision point 610, the process 600 replicates a minimal executable portion of the master overloaded virtual image for the preconfigured part at block 612. When a determination is made not to instantiate a complete executable part at decision point 610, the process 600 replicates an executable portion of the master overloaded virtual image for the complete preconfigured part at block 614. As described above, replicating an executable portion of the master overloaded virtual image for the preconfigured part may include replicating a minimal executable portion of the master overloaded virtual image to implement master overloaded virtual image resource sharing and the determination as to whether to implement resource sharing may be made for each instantiated part.

At block 616, the process 600 stores the replicated executable part to storage associated with a virtual machine host (e.g., a server such as one of the server_1 114 through the server_N 116). At block 618, the process 600 configures the replicated part as a virtual machine associated with the solution. As described above, configuring the replicated part as a virtual machine may include configuring a replicated minimal executable portion of the master overloaded virtual image that is instantiated as the virtual machine to utilize at least one shared resource located within the master overloaded virtual image.

At decision point 620, the process 600 makes a determination as to whether to form a connection between the instantiated virtual machine and another instantiated virtual machine. It is understood that the first iteration of the process 600 will result in a negative determination at decision point 620. However, subsequent iterations may include a determination to form an operational connection between instantiated virtual machines. Additionally, as described above, where two master overloaded virtual images include a part connection between a first instantiable preconfigured part within a first master overloaded virtual image and a second instantiable preconfigured part within a second master overloaded virtual image, an operational connection may be established between the instantiated virtual machines based upon the part connection. When a determination is made at decision point 620 to connect the instantiated virtual machine to at least one other instantiated virtual machine, the process 600 establishes a connection between instantiated virtual machines at block 622.

When a determination is made at decision point 620 not to connect the instantiated virtual machine to at least one other instantiated virtual machine, or upon establishing a connection between instantiated virtual machines at block 622, the process 600 makes a determination at decision point 624 as to whether another part is associated with the current master overloaded virtual image to be instantiated for the solution. As described above, a master overloaded virtual image may be defined to include a single solution or multiple platform agnostic solutions. In either situation, where multiple virtual machines are defined to implement a solution, multiple parts are configured for instantiation of the respective virtual machines within at least one master overloaded virtual image. When a determination is made at decision point 624 that another part is associated with the current master overloaded virtual image to be instantiated for the solution, the process 600 returns to block 608 and iterates as described above and this processing continues for each part to be instantiated from the master overloaded virtual image.

When a determination is made at decision point 624 that another part associated with the current master overloaded virtual image is not to be instantiated for the solution, the process 600 makes a determination at decision point 626 as to whether another master virtual image is associated with the solution. As described above, two or more master virtual images may be associated with a solution, with at least a primary master virtual image including a master overloaded virtual image. The second master virtual image may include one or more less-frequently used parts. As such, the second master virtual image may also include a master overloaded virtual image. When a determination is made that another master virtual image is associated with the solution, the process 600 returns to decision point 604 and iterates as described above for each such additional master virtual image.

When a determination is made that another master virtual image is not associated with the solution, the process 600 initiates startup of each instantiated virtual machine and begins managing the deployed virtual machines that form the solution at block 628. It is understood that the management of the deployed virtual machines may include additional processing. This additional processing is not described for brevity. However, any such management activities are considered within the scope of the present subject matter. Upon completion of initiating startup of each instantiated virtual machine and beginning management of the deployed virtual machines that form the solution at block 628, the process 600 returns to decision point 602 to await an indication to deploy a solution to be detected or received.

As such, the process 600 deploys one or more master overloaded virtual images to storage associated with a hypervisor cloud that includes a group of servers if the master overloaded virtual image(s) is not already stored in association with the hypervisor cloud. Each of the group of servers is configured as a virtual host based upon a hypervisor platform to support at least one virtual machine. The process 600 replicates at least a minimal executable portion of the master overloaded virtual image for each virtual machine that forms the solution. Minimal executable portions that are instantiated may be configured to reuse a portion of the master overloaded virtual image. Complete parts are instantiated to include all resources used during operation. Operational connections are established between instantiated virtual machines. These connections may be established based upon part connections associated with preconfigured instantiable parts within one or more master virtual images.

As described above in association with FIG. 1 through FIG. 6, the example systems and processes provide virtual image overloading for solution deployment. Many other variations and additional activities associated with virtual image overloading for solution deployment are possible and all are considered within the scope of the present subject matter.

Those skilled in the art will recognize, upon consideration of the above teachings, that certain of the above examples are based upon use of a programmed processor, such as the CPU 300. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on 'the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
receiving, at a virtual image configuration device, an instantiable virtual machine part definition and part configuration metadata of an instantiable virtual machine capable of deployment as at least a portion of a service solution from a master overloaded virtual image;

determining whether to configure the instantiable virtual machine to reuse, via virtual image sharing, at least one portion of the master overloaded virtual image during deployment of the instantiable virtual machine within a service solution;

identifying, from the instantiable virtual machine part definition and part configuration metadata in response to determining to configure the instantiable virtual machine to reuse, via the virtual image sharing, the at least one portion of the master overloaded virtual image, a minimal executable virtual machine part core of the instantiable virtual machine that reuses, via the virtual image sharing, the at least one portion of the master overloaded virtual image during execution;

configuring a minimal executable virtual machine part instantiable from the identified minimal executable virtual machine part core as the instantiable virtual machine to utilize, via the virtual image sharing, a shared resource within the master overloaded virtual image during execution; and storing the part configuration metadata for use during instantiation of the instantiable virtual machine from the master overloaded virtual image during service solution deployment.

2. The method of claim 1, where the master overloaded virtual image is deployable to a hypervisor cloud that comprises a plurality of servers, each of the plurality of servers configured based upon a hypervisor platform to support at least one instantiated virtual machine, and where the service solution comprises a platform agnostic pattern independent of the hypervisor platform.

3. The method of claim 1, further comprising adding the configured minimal executable virtual machine part to the master overloaded virtual image.

4. The method of claim 3, where adding the configured minimal executable virtual machine part to the master overloaded virtual image comprises adding a complete virtual machine part definition comprising one or more configuration options usable to instantiate full virtual machine parts from the configured minimal executable virtual machine part.

5. The method of claim 1, further comprising configuring an instantiation profile usable to instantiate the instantiable virtual machine based upon the received part configuration metadata, where either a complete virtual machine part or the minimal executable virtual machine part are instantiable using the instantiation profile.

6. The method of claim 5, further comprising adding the instantiation profile to the master overloaded virtual image.

7. A system, comprising:
a communication module; and
a processor programmed to:
receive, via the communication module, an instantiable virtual machine part definition and part configuration metadata of an instantiable virtual machine capable of deployment as at least a portion of a service solution from a master overloaded virtual image;

determine whether to configure the instantiable virtual machine to reuse, via virtual image sharing, at least one portion of the master overloaded virtual image during deployment of the instantiable virtual machine within a service solution;

identify, from the instantiable virtual machine part definition and part configuration metadata in response to determining to configure the instantiable virtual machine to reuse, via the virtual image sharing, the at least one portion of the master overloaded virtual image, a minimal executable virtual machine part core of the instantiable virtual machine that reuses, via the virtual image sharing, the at least one portion of the master overloaded virtual image during execution;

configure a minimal executable virtual machine part instantiable from the identified minimal executable virtual machine part core as the instantiable virtual machine to utilize, via the virtual image sharing, a shared resource within the master overloaded virtual image during execution; and store the part configuration metadata for use during instantiation of the instantiable virtual machine from the master overloaded virtual image during service solution deployment.

8. The system of claim 7, where the master overloaded virtual image is deployable to a hypervisor cloud that comprises a plurality of servers, each of the plurality of servers configured based upon a hypervisor platform to support at least one instantiated virtual machine, and where the service solution comprises a platform agnostic pattern independent of the hypervisor platform.

9. The system of claim 7, where the processor is further programmed to add the configured minimal executable virtual machine part to the master overloaded virtual image.

10. The system of claim 9, where, in being programmed to add the configured minimal executable virtual machine part to the master overloaded virtual image, the processor is programmed to add a complete virtual machine part definition comprising one or more configuration options usable to instantiate full virtual machine parts from the configured minimal executable virtual machine part.

11. The system of claim 7, where the processor is further programmed to configure an instantiation profile usable to instantiate the instantiable virtual machine based upon the received part configuration metadata, where either a complete virtual machine part or the minimal executable virtual machine part are instantiable using the instantiation profile.

12. The system of claim 11, where the processor is further programmed to add the instantiation profile to the master overloaded virtual image.

13. A computer program product, comprising:
a computer-readable storage device having computer-readable program code embodied therewith, where the computer-readable program code when executed on a computer causes the computer to:
receive an instantiable virtual machine part definition and part configuration metadata of an instantiable virtual machine capable of deployment as at least a portion of a service solution from a master overloaded virtual image;

determine whether to configure the instantiable virtual machine to reuse, via virtual image sharing, at least one portion of the master overloaded virtual image during deployment of the instantiable virtual machine within a service solution;

identify, from the instantiable virtual machine part definition and part configuration metadata in response to determining to configure the instantiable virtual machine to reuse, via the virtual image sharing, the at least one portion of the master overloaded virtual image, a minimal executable virtual machine part core of the instantiable virtual machine that reuses, via the virtual image sharing, the at least one portion of the master overloaded virtual image during execution;

configure a minimal executable virtual machine part instantiable from the identified minimal executable virtual machine part core as the instantiable virtual machine to utilize, via the virtual image sharing, a shared resource within the master overloaded virtual image during execution; and store the part configuration metadata for use during instantiation of the instantiable virtual machine from the master overloaded virtual image during service solution deployment.

14. The computer program product of claim 13, where the master overloaded virtual image is deployable to a hypervisor cloud that comprises a plurality of servers, each of the plurality of servers configured based upon a hypervisor platform to support at least one instantiated virtual machine, and where the service solution comprises a platform agnostic pattern independent of the hypervisor platform.

15. The computer program product of claim 13, where the computer-readable program code when executed on the computer further causes the computer to add the configured minimal executable virtual machine part to the master overloaded virtual image.

16. The computer program product of claim 15, where, in being programmed to add the configured minimal executable virtual machine part to the master overloaded virtual image, the computer-readable program code when executed on the computer causes the computer to add a complete virtual machine part definition comprising one or more configuration options usable to instantiate full virtual machine parts from the configured minimal executable virtual machine part.

17. The computer program product of claim 13, where the computer-readable program code when executed on the computer further causes the computer to configure an instantiation profile usable to instantiate the instantiable virtual machine based upon the received part configuration metadata, where either a complete virtual machine part or the minimal executable virtual machine part are instantiable using the instantiation profile.

18. The computer program product of claim 17, where the computer-readable program code when executed on the computer further causes the computer to add the instantiation profile to the master overloaded virtual image.

* * * * *